United States Patent [19]

Ellis et al.

[11] 4,153,145
[45] May 8, 1979

[54] HEAVY DUTY HYDRAULIC SHOCK ABSORBER

[75] Inventors: Larry C. Ellis, Farmington Hills; John S. Ellis, Union Lake, both of Mich.

[73] Assignee: Ace Controls, Inc., Farmington, Mich.

[21] Appl. No.: 865,962

[22] Filed: Dec. 30, 1977

[51] Int. Cl.² ............................ F16F 9/42; F16F 9/44; F16F 9/346

[52] U.S. Cl. .................. 188/274; 137/625.37; 188/285; 188/287; 188/315; 188/318; 267/118; 280/710

[58] Field of Search ............... 188/286, 287, 274, 315, 188/285, 299, 313, 318; 213/8, 43; 267/65 D, 121, 113, 115, 116, 118, 119, 120, 34; 280/710; 137/625.34, 625.37

[56] References Cited

U.S. PATENT DOCUMENTS

| 1,980,085 | 11/1934 | Perry et al. | 137/625.37 X |
| 2,989,081 | 6/1961 | Olsen | 137/625.37 |
| 3,059,268 | 10/1962 | McHale | 16/62 |
| 3,207,270 | 5/1969 | Gryglas | 188/287 |
| 3,340,965 | 9/1967 | Ellis, Jr. | 188/287 |
| 3,446,317 | 5/1969 | Gryglas | 188/287 |
| 3,510,117 | 5/1970 | Scholin et al. | 188/287 X |
| 3,693,767 | 9/1972 | Johnson | 188/287 X |
| 3,998,302 | 12/1976 | Schupner | 188/287 X |
| 4,057,236 | 11/1977 | Hennells | 188/287 X |

FOREIGN PATENT DOCUMENTS 821575  11/1951  Fed. Rep. of Germany .......... 188/274

OTHER PUBLICATIONS

Bigger Bore, Higher Pressures Increase Capacity of Shock Absorbers, Design News, 2/7/72, p. 39.

Primary Examiner—George E. A. Halvosa
Attorney, Agent, or Firm—Robert G. Mentag

[57] ABSTRACT

A heavy duty hydraulic shock absorber having an inner tube in which is slidably mounted an impact receiving piston assembly. Upon application of an impact force on the piston assembly, the piston assembly is moved inwardly of the inner tube and fluid from the inner tube is metered through a plurality of exponentially disposed metering orifices into an accumulator chamber formed between the inner tube and an outer tube which encloses the inner tube. An adjustable, slidable metering spool is operatively mounted in the accumulator chamber, over the metering orifices, for regulating the flow of fluid through the metering orifices into the accumulator chamber.

5 Claims, 4 Drawing Figures

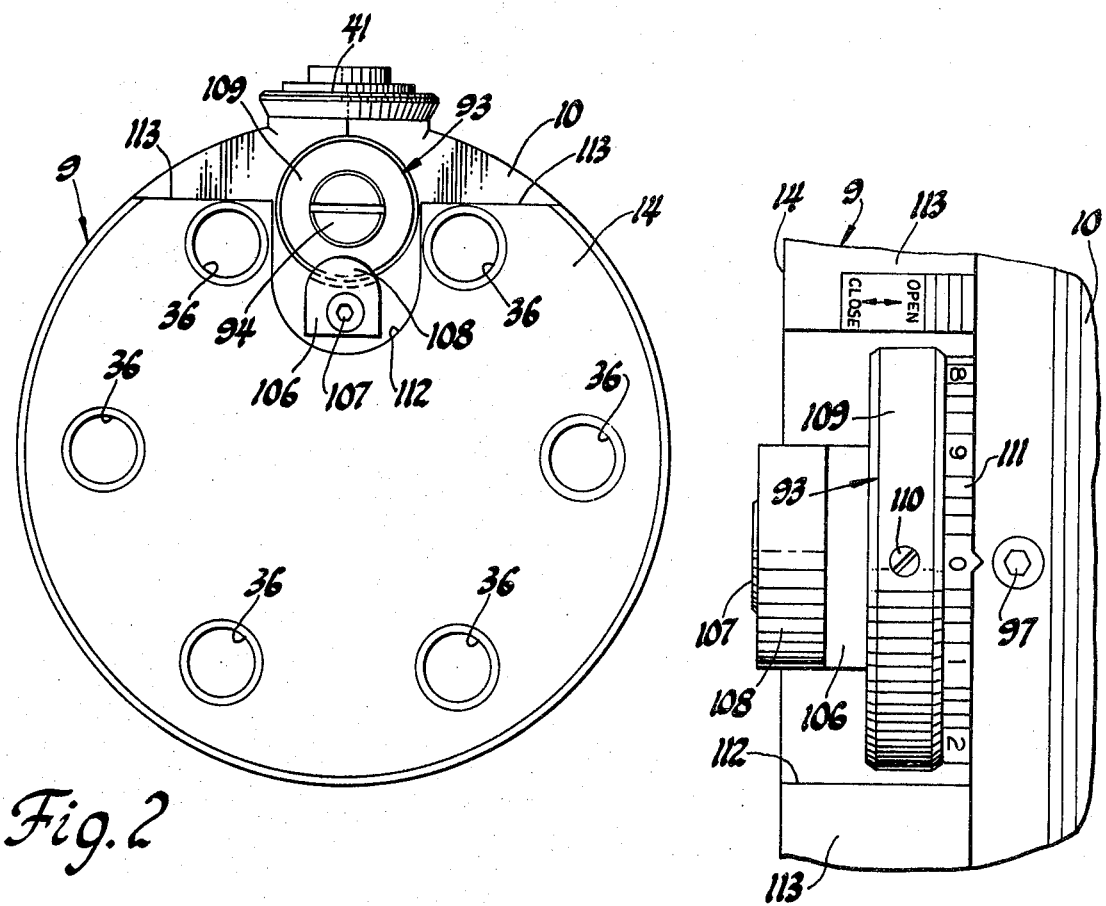
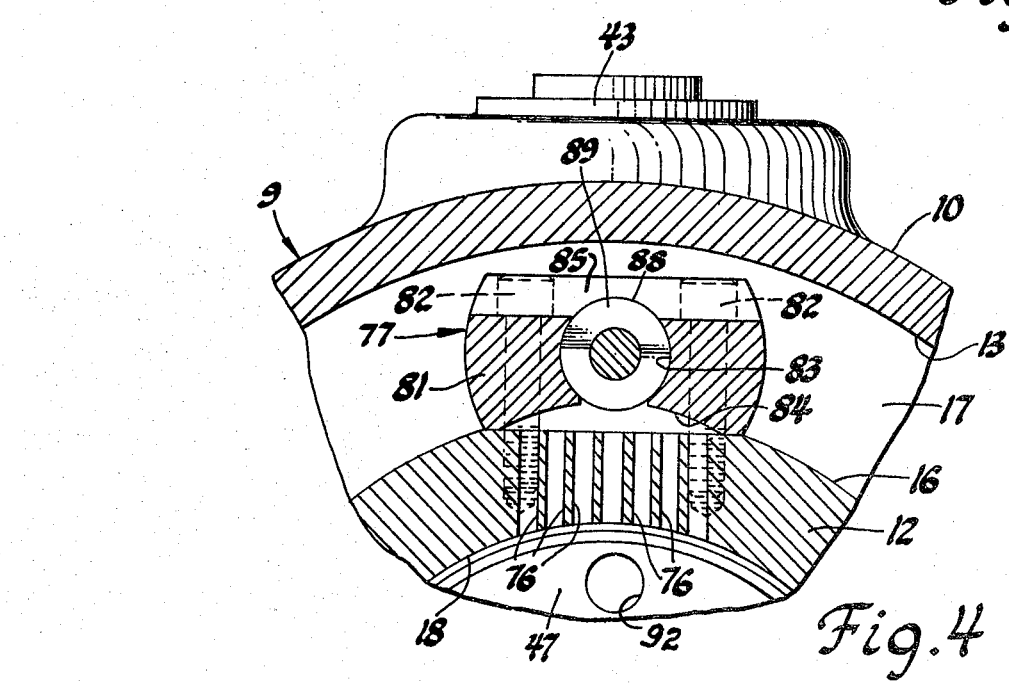

HEAVY DUTY HYDRAULIC SHOCK ABSORBER

BACKGROUND OF THE INVENTION

1. Field of the Invention

This invention relates generally to the hydraulic shock absorber art, and more particularly to an improved heavy duty hydraulic shock absorber which is adapted for various uses, as for example, industrial machines, as in molding machine transfer equipment, overhead crane stops, and other similar applications, and which is capable of being adjusted to provide controlled, linear deceleration of loads.

2. Description of the Prior Art

The prior art hydraulic shock absorbers generally include an inner pressure chamber which is filled with fluid, and in which is slidably mounted a piston that is connected to a piston rod which is adapted to receive impact forces. The pressure tube of the prior art shock absorbers is provided with metering orifices through which fluid is forced when the piston rod receives an impact load. The prior art shock absorbers are provided with means for regulating the opening of the metering orifices. However, such prior art constructions have the disadvantage in that they are not as efficient as might be desired, and there is leakage or slippage between the inner pressure tube and the means for regulating the opening of the metering orifices. Another disadvantage of the prior art hydraulic shock absorbers is that the means for adjusting the opening of the metering orifice does not provide a fine adjustment means, nor does it provide a sharp edge means for controlling the opening of the orifice. A further disadvantage is that the prior art shock absorbers are not capable of providing heavy duty controlled reduction of impact forces with a fine adjustment over a wide range of impact forces and with a self-contained construction.

SUMMARY OF THE INVENTION

The heavy duty hydraulic shock absorber of the present invention comprises an elongated, cylindrical outer tube or body in which is mounted a smaller diameter inner tube. The outer tube is provided on its outer surface with a plurality of evenly spaced apart cooling ribs. The rear end of the outer tube is enclosed by a suitable plug which is fixed to the rear end of the inner tube. The front end of the outer tube is enclosed by a front end plug which is fixed to the front end of the inner tube. The front and rear end plugs retain the inner tube in a spaced apart position relative to the outer tube to form an accumulator chamber between the inner tube and the outer tube.

A piston assembly is slidably mounted in a piston cylinder formed in the inner tube, and it carries an impact receiving head or button. A return stroke spring is provided for returning the piston assembly to its initial position after each impact receiving operation. The inner tube is provided with a plurality of sets of exponentially disposed metering orifices which communicate the piston cylinder in the inner tube with the accumulator chamber. A foam rubber means is mounted in the accumulator chamber. The flow of fluid through the metering orifices, during an impact receiving operation, when the piston assembly is moved inwardly in the piston cylinder, is controlled by a metering orifice regulating means.

The regulating means is disposed in the accumulator chamber, and it comprises a metering spool which is mounted in a sleeve member. The sleeve member is attached to the inner tube and it has a plurality of slots which communicate each set of metering orifices with the accumulator chamber. The metering spool has annular grooves which function to allow flow through the metering sleeve slots in accordance with the adjusted position of the metering spool. A rotatable, adjusting screw is provided for slidably adjusting the metering spool longitudinally in the metering spool sleeve. A fluid return passage means is formed through the piston assembly for allowing return of the fluid from the accumulator into the piston cylinder in the inner tube during a piston assembly retraction movement effected by the return spring. A floating piston ring closes off said fluid return passage means during an impact receiving operation.

Other objects, features and advantages of this invention will be apparent from the following detailed description, appended claims, and the accompanying drawings.

BRIEF DESCRIPTION OF THE DRAWINGS

FIG. 2 is a left hand view of the shock absorber structure illustrated in FIG. 1, taken along the line 2—2 thereof, and looking in the direction of the arrows.

FIG. 3 is a fragmentary, enlarged, horizontal plan view of the shock absorber structure illustrated in FIG. 1, taken along the line 3—3 thereof, and looking in the direction of the arrows.

FIG. 4 is a fragmentary, enlarged, elevation section view of the shock absorber structure illustrated in FIG. 1, taken along the line 4—4 thereof, and looking in the direction of the arrows.

DESCRIPTION OF THE PREFERRED EMBODIMENT

Figure 1:
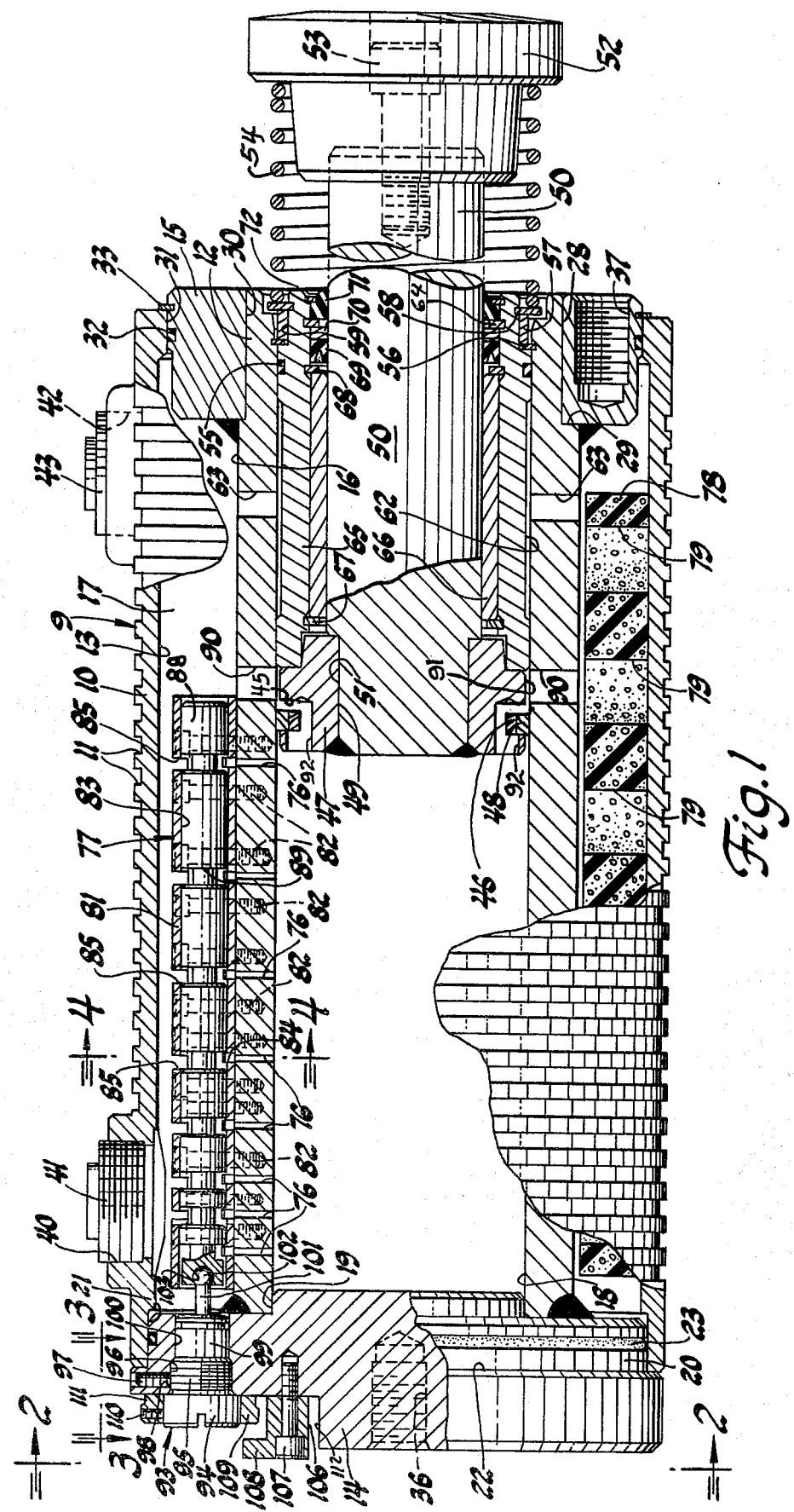
FIG. 1 is a longitudinal view, with parts in section and parts broken away, of a shock absorber embodying the principles of the present invention.

Referring now to the drawings, and in particular to FIG. 1, the numeral 9 generally designates a heavy duty shock absorber made in accordance with the principles of the present invention. The shock absorber 9 includes a cylindrical outer tube or body 10 which is provided around the majority of its periphery with a plurality of equally spaced integral cooling ribs which provide maximum heat dissipation. The provision of the cooling ribs 11 eliminates in some cases the need for an external cooling device. The shock absorber 9 further includes an inner metering tube 12. The outer tube 10 and inner tube 12 are made from suitable metal. The circular chamber 13 which is formed between the outer tube 10 and the inner tube 12 functions as an accumulator chamber as described more fully hereinafter.

As shown in FIG. 1, the rear end of the outer tube is enclosed by a suitable circular rear end plug or head 14. The front end of the outer tube 10 is enclosed by a circular front end plug or head 15. The rear end plug 14 and the front end plug 15 are suitably secured to the inner tube 12 by suitable means, as by being welded or brazed together.

As shown in FIG. 1, the outer periphery of the inner tube 12 indicated by the numeral 16, and the space between the inner and outer tubes is indicated by the numeral 17, and comprises said accumulator chamber. The numeral 18 in FIG. 1 designates the interior chamber in the inner tube 12, and it comprises a piston cylinder in which is slidably mounted a piston 47. The numeral 19 in FIG. 1 indicates a reduced diameter inner end of the rear end plug 14 and it forms a shoulder 19 which is slidably mounted in the piston cylinder 18 of the inner tube 12. The numeral 20 in FIG. 1 designates an intermediate reduced diameter portion of the rear end plug 14 which is seated in an enlarged rear end bore 21 formed in the outer tube 10. The numeral 22 designates a shoulder formed at the rear end plug reduced diameter portion 20 which abuts the rear end of the outer tube 10. A suitable O-ring seal 23 is operatively mounted in the reduced diameter portion 20 of the rear end plug 14, and it sealingly engages the bore 21 in the outer tube 10.

The numeral 28 in FIG. 1 is a reduced diameter outer end portion on the front end of the inner tube 12 and it terminates at its inner end in a shoulder 29. The reduced diameter front end 28 of the inner tube 12 is slidably received in an axial bore 30 formed through the front plug 15. The outer periphery of the front end plug 15 is slidably received within the reduced diameter outer end bore 31 formed in the front end of the outer tube 10. A suitable O-ring 32 is formed around the front end plug 15, and it sealingly engages the bore 31 in the outer tube 10. A suitable retainer ring 33 is operatively mounted in the front end plug 15 for retaining the inner tube assembly 12 and the rear plug 14 and the front plug 15 in position in the outer tube 10.

As shown in FIG. 2, a plurality of suitable threaded axial holes 36 are formed in the rear plug 14 for mounting the shock absorber in a suitable operative position. A similar plurality of threaded holes 37 are formed in the front plug 15, as shown in FIG. 1 for mounting the shock absorber in an operative position.

As shown in FIG. 1, the shock absorber 9 may be filled with suitable hydraulic fluid through either one of a pair of plugs 41 and 42 which are mounted in suitable threaded bores 40 and 43, respectively, which are formed through the outer wall of the outer tube 10.

As shown in FIG. 1, the shock absorber 9 includes a piston rod 50 which has operatively mounted on the outer end thereof an impact receiving head or button 52, which is secured to the piston rod 50 by a suitable screw 53. The piston rod 50 is movably mounted within the inner tube 12 from the front end thereof, and it is provided with a reduced diameter inner end 51 on which is fixedly mounted as by welding or brazing a piston 47. A piston ring 48 is movably mounted around the periphery of the piston 47 and it is mounted in a longitudinally extended opening 45 for movement longitudinally of the piston 47 for admitting fluid into the inner tube 10 when the piston 47 is retracted, as more fully described hereinafter. The piston ring 48 is provided with a suitable piston back-up ring 46. The piston 47 is provided with a bore 49 in which is slidably received the inner reduced diameter end 51 of the piston rod 50.

A stroke return spring 54 is operatively mounted around the outer end of the piston rod 50. The outer end of the spring 54 abuts against the inner side of a flange formed around the outer end of the button 52. The inner end of the spring 54 abuts against a retainer ring 59 which is mounted on the outer end of a combination bearing and seal retainer sleeve 65. The bearing and seal retainer sleeve 65 is slidably mounted in the front end of the piston cylinder 18 in the inner tube 12, and it is retained in place by a retainer ring 56. A spacer ring 57 is mounted between the retainer rings 56 and 58. A suitable O-ring 55 is operatively mounted around the outer periphery of the bearing and seal retainer sleeve 65, and it sealingly engages the front end of the piston cylinder 18.

The front end of the bearing and seal retainer sleeve 65 is provided with a reduced diameter 59 around which is seated the spacer ring 57, the retainer rings 56 and 58. A reduced diameter longitudinally extended groove 62 is formed around the bearing and seal retainer sleeve 65 and communicates through a plurality of bores or ports 63 with the accumulator chamber 17. A cylindrical bearing sleeve 66 is operatively mounted within the bore of the bearing and seal retainer sleeve 65, and it is secured in its longitudinally disposed position by a pair of suitable retainer rings 67 and 68. A suitable U-shaped or cup-shaped seal ring 69 is mounted around the piston rod 50 and it is disposed within the bearing and seal retainer sleeve 65 in a position outwardly of the retainer ring 68. The spacer 70 is mounted on the outer side of the seal 69. The wiper ring 71 is mounted around the piston rod 50 outwardly of the spacer ring 70. A retainer ring 64 is positioned on the inner side of the wiper 71 in a position between the wiper 71 and the spacer ring 70. An outer retainer ring 72 retains the wiper 71 on the piston rod 50.

As shown in FIGS. 1 and 4, the inner tube 12 is provided with a plurality of metering orifices 76 in a plurality of spaced positions along the longitudinal direction of the inner tube 12. The orifices 76 in each of the positions shown in FIG. 1, are uniform in diameter and they are axially spaced apart exponentially from the adjacent group of orifices 76. It will be seen from FIG. 4 that the group of orifices 76 at each of the metering orifices positions are aligned on the same diameter plane. The individual effective areas of the orifices 76 are uniform. The total effective cross sectional area of the metering orifices 76 available for fluid displacement therethrough decreases exponentially with the stroke of the piston 47 inwardly or to the left of the piston cyclinder 18, as viewed in FIG. 1.

The shock absorber 9 is provided with a metering means which is generally indicated with the numeral 77, in FIGS. 1 and 4, for controlling the total effective area of the orifices 76 during an impact or load receiving operation. As shown in FIG. 1, a suitable foam rubber or sponge 78 is operatively mounted in the accumulator chamber 17 around substantially all of the circular area of the chamber 17 for stroke absorbing action. The use of foam rubber in the accumulator area of the shock absorber is conventional and so the foam rubber 78 functions in the usual conventional manner. The foam rubber 78 is provided with radial holes 79.

As shown in FIGS. 1 and 4, the metering means 77 includes a metering spool body or sleeve 81 which is provided with a longitudinal bore 83, in which is slidably mounted a sliding metering spool 88. As shown in FIGS. 1 and 4, the metering spool sleeve 81 is secured by a plurality of screws, as 82, to the outer periphery 16 of the inner tube 12. The metering sleeve 81 is provided on the lower side thereof with an arcuate slot 84 over each set of metering orifices 76. Each of the inner arcuate recesses 84 communicates with the spool bore 83 which in turn communicates with an outer transverse slot 85 formed in vertical alignment with its mating inner slot 84. It will be seen in FIG. 1 that a pair of inner and outer slots 84 and 85 are formed in alignment with each of the sets of metering orifices 76. The outer orifices 85 communicate with the accumulator chamber 17. The metering spool 88 is provided with a plurality of annular metering grooves 89 which are adapted to cooperate with the slots 84 and 85 for metering fluid flowing through the orifices 76 during an impact or load receiving operation, as more fully described hereinafter. As shown in FIG. 1, the accumulator chamber 17 communicates through a plurality of bores or ports 90 which are formed through the inner tube 12 in equally spaced positions around the periphery threof. The inner end of the ports 90 communicate with the piston cylinder 18, and with the peripheral space formed around the outer periphery 91 of the piston 47 and the cylinder wall of the piston cylinder 18. When the piston 47 is moved outwardly or to the right as viewed in FIG. 1, by the spring 54 during a retraction movement, it will be seen that fluid can flow from the accumulator 17 and through the ports 90 and into the annular space 91 around the piston 47 and thence through the opening 45 and around the piston ring 48 which will have moved to the position shown in FIG. 1, and thence out through the plurality of circularly disposed bores 92 formed in the piston 47, and thence back into the piston cylinder 18 to reload the inner tube 12 for succeeding impact load receiving operation.

The metering spool 88 is longitudinally adjusted by an adjusting screw generally indicated by numeral 93 in FIGS. 1, 2 and 3. The adjusting screw 93 is provided with an enlarged head 94 and reduced diameter integral threaded body 95 and a further reduced diameter smooth surfaced inner end 99. The adjusting screw threaded body portion 95 is suitably mounted in a threaded bore 96. The threaded bore 96 is formed in the rear plug 14 and it is adapted to be held in an adjusted position by a suitable set screw 97. Set screw 97 is mounted in a radial threaded hole 98 formed in the rear plug 14. The inner smooth diameter portion 99 of the adjusting screw 93 is rotatably mounted in a bore 100 formed in the plug 14 inwardly of the threaded bore 96. A reduced diameter rod 101 is integrally formed on the inner end of the screw portion 99, and it has an integral ball 102 formed on the inner end thereof which is received in a suitable cross slot 103 formed in the outer end of the metering spool 88. It will be seen that when the adjusting screw 93 is rotated inwardly or outwardly, that the metering spool 88 will be moved accordingly.

The rate at which loads are decelerated by the shock absorber 9 is a function of the rate at which fluid is displaced through the metering orifices 76 which in turn is a function of the effective area of the orifices 76. The effective cross sectional area of each of the orifices 76 may be varied infinitely, within the range of the shock absorber, and uniformally by slidably adjusting the position of the spool 88 within the sleeve 81. The degree or extend of adjustment of the spool 89 depends upon the number of threads per inch of the threaded portion 95 of the adjustment screw 93. It will be seen that the spool 88 is in a full flow position, as shown in FIG. 1, but when it is moved to the left or rearwardly as shown in FIG. 1, that the annular grooves 89 will be moved over the inner and outer slots 84 and 85 so as to close the passage therethrough and reduce the effective flow area through the orifices 76. The sliding spool 88 provides smooth adjustment control of flow through the orifices 76 with high stability and sharp edge orificing and a minimum fluid slippage or leakage between the piston cylinder 18 and the accumulator chamber 17. It will be understood that the effective cross section of the orifices 76 will be reduced by suitable adjustment of the spool 88 for reducing high impact loads as desired.

As shown in FIGS. 1 and 3, the outward adjustment movement of the adjusting screw 93 is limited by a spool adjustment stop member 108 which is integrally formed on the upper end of a body 106 that is secured by a screw 107 to the rear plug 14. As shown in FIG. 3, the adjusting screw 93 is provided with a dial indicator 111 which is a circular member which is secured by set screw 110 on the adjusting screw head 94. As shown in FIG. 2, the rear end plug 14 is provided with a transverse cut-out portion which has its inner end terminated at the shoulder 113 to provide clearance for the adjusting screw 93. The adjusting screw 93 and stop member 108 is also disposed in a U-shaped recess 112 which communicates with the last mentioned recess.

In operation of the shock absorber 10, impact receiving forces received on the button 52 cause the piston rod 50 and piston 47 to move rearwardly or inwardly to the left in the inner tube 12. As the rearward movement of the piston 47 commences, pressure initially built up in the hydraulic fluid within the piston cylinder 18 causes the floating piston ring 48 to be forced into abutment with the forward end of the circular groove 45, thereby preventing hydraulic fluid flowing there past. During a inward or rearward movement of the piston 47, the hydraulic fluid is forced outwardly from the inner tube 12 and out through the metering orifices 76 and through the inner slots 84, the annular grooves 89 and the spool 88, and through the slots 85 and into the accumulator chamber 17. The cellular foam rubber 78 compresses to compensate for the fluid displaced by the piston rod 50 and piston 47 during the inward stroke of the piston 47. As the piston 47 moves past and closes off successive metering orifices 76, there is a reduction in the number of orifices 76, and hence a total effective area of the orifices, through which fluid can be displaced from the inner tube 12. At the beginning of the stroke of the piston rod 50, the total effective area of the orifices available for fluid displacement is at a maximum, while at the end of the stroke, when the piston 47 is moved past all of the orifices 76, the total effective area of the orifices 76 available for fluid displacement is zero. Because the orifices 76 are of uniform diameter and are axially spaced apart exponentially, and because the individual effective areas of the orifices 76 at each position are uniform, the total orifice area available for fluid displacement decreases exponentially with the inward stroke of the piston 47. When the impact force is removed from the button 52, the spring 54 serves to return the piston rod 50 and the piston 47 to the initial normal at rest position shown in FIG. 1. During such forward or outward return movement of the piston rod 50 and piston 47, the floating piston ring 48 abuts the rearward side of the annular groove 45 thereby permitting the free flow of hydraulic fluid from the accumulator 17 through the ports 90 and around the passage 91 and through the groove 45, and out through the ports 92 into the piston cylinder 18.

The shock absorber 9 can be used in either self contained structures, as shown in FIG. 1, or external accumulator modes. Because of its heavy duty construction and fine adjustment over a wide range, the shock absorber 9 is ideal for foundry and steel mill applications, such as in molding machine transfer equipment, overhead crane stops, control of head carriages, billet stops and other high energy control requirements. The external adjusting screw 93 activates the spool 88 to reduce or increase the flow through the orifices 76, thus permitting extremely fine variations in load absorbing capacity.

While it will be apparent that the preferred embodiment of the invention herein disclosed is well calculated to fulfill the objects above stated, it will be appreciated that the invention is suceptible to modification, variation and change.

What is claimed is:

1. A shock absorber comprising:
   (a) an outer tube enclosed by a rear head and a front head;
   (b) an inner tube mounted in said outer tube and enclosed at its ends by said heads;
   (c) a piston assembly, including a piston rod slidably mounted in said inner tube through said front head;
   (d) an impact receiving button on the outer end of said piston rod for receiving loads to be decelerated;
   (e) a chamber formed interior of said outer tube and between said inner tube and outer tube;
   (f) a plurality of longitudinally spaced metering orifice means formed through said inner tube and communicating said inner tube with said chamber;
   (g) a metering means in said chamber for regulating flow of fluid through said orifice means when the piston assembly is moved inwardly in said inner tube by a load on said button;
   (h) a fluid return passage means for returning the fluid from said chamber to said inner tube when the piston assembly is moved outwardly of said inner tube after said load is decelerated;
   (i) each of said metering orifice means includes a set of transverse, parallel orifices disposed on a common diameter plane;
   (j) said metering means for regulating flow of fluid through said orifice means including a sleeve member mounted on the outer side of said inner tube over said orifices, and a slidable metering spool mounted in said sleeve member;
   (k) said sleeve member being provided with slot means for communicating said orifices with said chamber;
   (l) said metering spool being provided with a plurality of annular grooves for regulating the opening of said slot means for controlling the flow of fluid from said orifices and through said slot means and into said chamber;
   (m) an adjusting screw means connected to said metering spool for adjusting said metering spool in said sleeve member;
   (n) said slot means in said sleeve member including a plurality of first slots formed on the inner side of the sleeve member adjacent the inner tube, with each of said first slots being disposed over one of said sets of parallel orifices;
   (o) said slot means in said sleeve member further including a plurality of second slots, aligned with said plurality of first slots, and being formed diametrically opposite to said plurality of first slots and communicating with said chamber; and,
   (p) means for retaining said adjusting screw means in an adjusted position.

2. A shock absorber as defined in claim 1, including:
   (a) a cellular material disposed in said chamber.

3. A shock absorber as defined in claim 1, wherein:
   (a) said piston assembly includes a floating piston ring for blocking fluid flow through said fluid return passage means when said piston assembly is moved into said inner tube during a load decelerating operation.

4. A shock absorber as defined in claim 1, wherein:
   (a) said outer tube is provided on its outer periphery with a plurality of integral cooling ribs.

5. A shock absorber as defined in claim 1, wherein:
   (a) said adjusting screw means is provided with a position indicator means.

* * * * *

UNITED STATES PATENT OFFICE
CERTIFICATE OF CORRECTION

Patent No. 4,153,145                    Dated May 8, 1979

Inventor(s) Ellis et al

It is certified that error appears in the above-identified patent and that said Letters Patent are hereby corrected as shown below:

Column 3, line 36, "42" should be --43--.

Signed and Sealed this

Twenty-first Day of August 1979

[SEAL]

Attest:

Attesting Officer

LUTRELLE F. PARKER
Acting Commissioner of Patents and Trademarks